US010158585B2

(12) United States Patent
Tamir et al.

(10) Patent No.: US 10,158,585 B2
(45) Date of Patent: Dec. 18, 2018

(54) PACKET PROCESSING WITH REDUCED LATENCY (71) Applicant: INTEL CORPORATION, Santa Clara, CA (US)

(72) Inventors: Eliezer Tamir, Bait Shemesh (IL); Jesse C. Brandeburg, Portland, OR (US); Anil Vasudevan, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 625 days.

(21) Appl. No.: 13/773,255

(22) Filed: Feb. 21, 2013

(65) Prior Publication Data
US 2014/0233583 A1 Aug. 21, 2014

(51) Int. Cl.
H04L 12/861 (2013.01)
G06F 9/48 (2006.01)
G06F 9/52 (2006.01)
G06F 9/32 (2018.01)
H04L 12/879 (2013.01)
G06F 9/448 (2018.01)

(52) U.S. Cl.
CPC ............ H04L 49/90 (2013.01); G06F 9/4812 (2013.01); G06F 9/526 (2013.01); H04L 49/901 (2013.01); G06F 9/327 (2013.01); G06F 9/4498 (2018.02)

(58) Field of Classification Search
CPC ......... H04L 49/90; H04L 29/06; G06F 9/327; G06F 9/444; G06F 9/4812; G06F 9/526
See application file for complete search history.

(56) References Cited

U.S. PATENT DOCUMENTS

| 6,047,380 | A  | * | 4/2000 | Nolan et al. .................. 713/324 |
| 6,256,660 | B1 | * | 7/2001 | Govindaraju et al. ........ 709/200 |
| 8,225,329 | B1 | * | 7/2012 | Lynn ............................. 719/314 |
| 8,266,633 | B1 | * | 9/2012 | Saulsbury et al. ............ 719/314 |
| 2002/0116538 | A1 | * | 8/2002 | Chen et al. .................... 709/314 |
| 2003/0058852 | A1 |   | 3/2003 | Luhmann et al. |
| 2003/0070010 | A1 | * | 4/2003 | Campbell et al. ............. 710/48 |

(Continued)

FOREIGN PATENT DOCUMENTS

EP 2 552 081 A2 1/2013

OTHER PUBLICATIONS

International Search Report and Written Opinion received for PCT Patent Application No. PCT/US2014/012643, dated Apr. 25, 2014, 12 Pages.

(Continued)

*Primary Examiner* — Walter J Divito
*Assistant Examiner* — Anthony Luo (57) ABSTRACT Generally, this disclosure provides devices, methods and computer readable media for packet processing with reduced latency. The device may include a data queue to store data descriptors associated with data packets, the data packets to be transferred between a network and a driver circuit. The device may also include an interrupt generation circuit to generate an interrupt to the driver circuit. The interrupt may be generated in response to a combination of an expiration of a delay timer and a non-empty condition of the data queue. The device may further include an interrupt delay register to enable the driver circuit to reset the delay timer, the reset postponing the interrupt generation.

11 Claims, 9 Drawing Sheets (56) References Cited

U.S. PATENT DOCUMENTS

| | | | |
|---|---|---|---|
| 2006/0150184 A1 | 7/2006 | Hankins et al. | |
| 2006/0262813 A1* | 11/2006 | Dygert | 370/477 |
| 2008/0040579 A1 | 2/2008 | Kang et al. | |
| 2008/0250203 A1 | 10/2008 | Schreter | |
| 2009/0323690 A1* | 12/2009 | Lu et al. | 370/392 |
| 2010/0138579 A1 | 6/2010 | Isrel et al. | |
| 2010/0192163 A1 | 7/2010 | Pope et al. | |
| 2010/0274941 A1 | 10/2010 | Wolfe | |
| 2011/0087913 A1* | 4/2011 | Robles | G06F 1/3215 |
| | | | 713/330 |
| 2013/0138760 A1 | 5/2013 | Tsirkin | |
| 2013/0254361 A1 | 9/2013 | Liu et al. | |
| 2013/0254775 A1 | 9/2013 | Michel et al. | |
| 2014/0059553 A1* | 2/2014 | Chandhoke | 718/102 |
| 2015/0049769 A1 | 2/2015 | Tamir et al. | |

OTHER PUBLICATIONS

Mogul et al., Eliminating Receive Livelock in an Interrupt-Driven Kernal, ACM Transactions on Computer Systems, vol. 15, No. 3, Aug. 1997.

Tamir, "Interrupt Handling in Linux", Intel, Feb. 5, 2009.

Tamir, "Linux Network Stack, Linus NIC Interface", Intel.

International Preliminary Report on Patentability received for PCT Patent Application No. PCT/US2014/012643, dated Sep. 3, 2015.

Office Action received for U.S. Appl. No. 15/400,629, dated Jan. 24, 2018, 14 pages.

\* cited by examiner

PACKET PROCESSING WITH REDUCED LATENCY

FIELD

The present disclosure relates to packet processing, and more particularly, to packet processing with reduced latency.

BACKGROUND

Network interfaces generally provide data packet transfer capabilities between a network and a host system. The host system may employ a driver circuit between the network interface and the operating system (or a user program or a system call performing an operation in the user's context) that produces and consumes the data packets. The network interfaces typically generates an interrupt to the driver circuit to signal a condition that may require the attention of the driver circuit, for example the completion of a data transfer and/or the availability of new packets. Interrupt processing is relatively computationally expensive, however, and consumes processor cycles that could have been used for other purposes. In particular, interrupt handling may increase network processing latency since it diverts the CPU in the midst of performing other tasks. A system that reduces the frequency of generated interrupts may therefore be advantageous. Attempts to reduce the number of generated interrupts, however, must not result in a loss of any interrupts as this would cause operational problems for the system.

Furthermore, network stack processing in the driver circuit often introduces additional latency in the transfer of packets between the network interface and user applications because the network stack processing is typically designed for higher throughput rather than lower latency. Some attempts to improve performance by sharing queue access between network stack processing and user context applications may result in synchronization problems. These conflicts may arise between the multiple user context system calls, acting on behalf of the user applications, and the network driver circuit, each of which may simultaneously attempt to access the network interface queues.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, methods and computer readable media for packet processing with reduced latency and reduced interrupt servicing requirements. A device driver circuit may be configured to service a network interface queue in both interrupt and polling modes. Additionally, applications (e.g., socket processing or other user context system calls) may be provided with more direct access to the queue so that the queue may be serviced with reduced latency. In some embodiments, this may be accomplished by mapping the queue to user space or by configuring the system call to poll the queue in system call context on behalf of the user. A synchronization mechanism (e.g., a lock) may be employed to prevent conflicts over queue access between the device driver circuit and user context processing.

In response to an interrupt from the network interface, further interrupts are disabled and the device driver circuit may enter a polling state. In the polling state, the network interface queue may be checked and serviced until the queue is empty, with access subject to a queue lock. This may increase the amount of data that is processed on a single interrupt and therefore reduce the number of interrupts at a given packet rate. When the queue has been serviced, if no other processes have yielded on the queue lock (i.e., were not able to obtain the queue lock), polling may be suspended and interrupts re-enabled. User context applications may similarly service the queue, with access subject to the queue lock. If other processes have yielded on the queue lock when the user context application is finished, the driver circuit may be set back into the polling state to ensure that packets do not go unprocessed. Alternatively, an interrupt may be forced to ensure that packets do not go unprocessed.

In some embodiments, the network interface may be configured with a capability to postpone interrupt generation in response to a request from the user context processing. The interrupt postponement request may be repeatedly issued by the user context processing while the queue is being serviced.

Although the various embodiments illustrated herein are directed to a network interface, it will be appreciated that the described concepts may be advantageously applied to any type of system having bandwidth or latency constraints.

Figure 1:
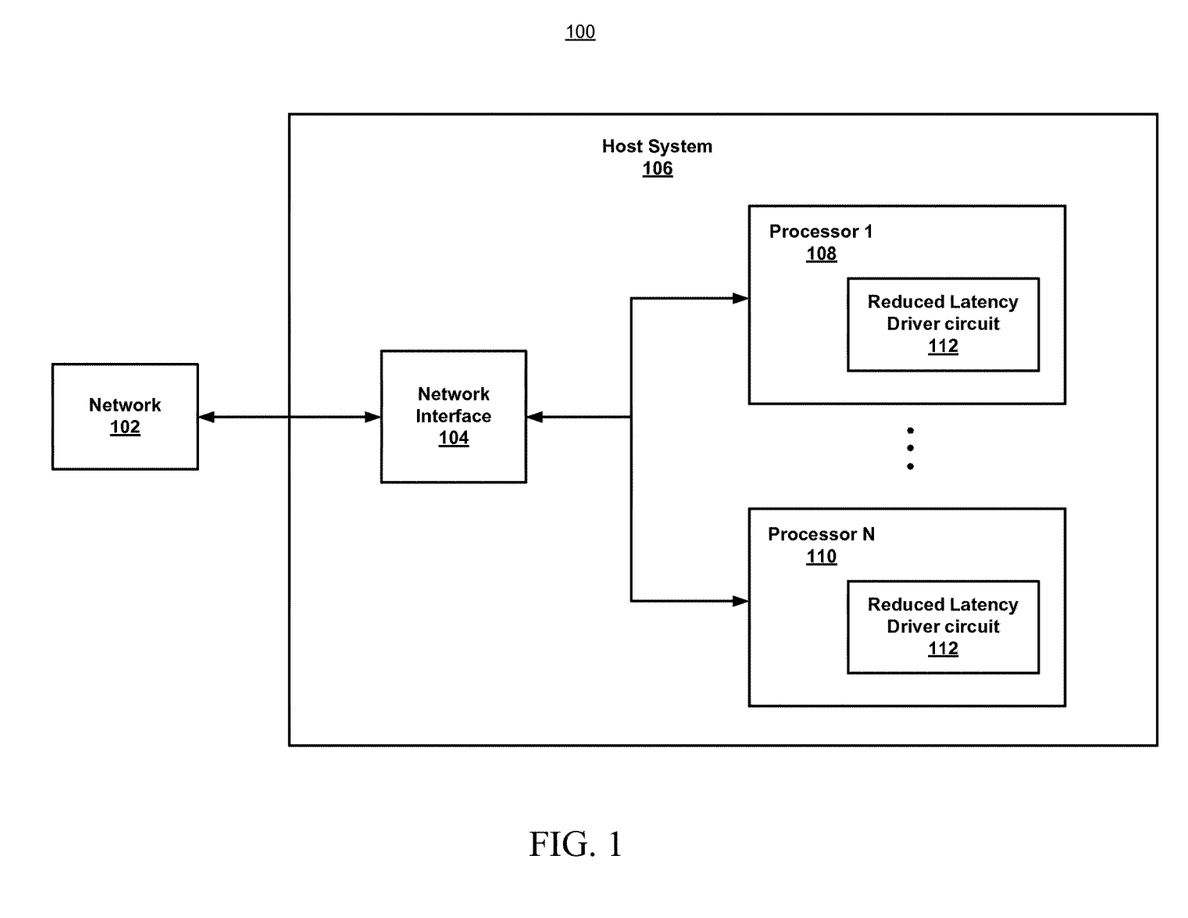
FIG. 1 illustrates a top level system diagram of one exemplary embodiment consistent with the present disclosure.

FIG. 1 illustrates a top level system diagram 100 of one exemplary embodiment consistent with the present disclosure. A network interface 104 is configured to transfer data between a host system 106 and a network 102. The network interface 104 may generally include circuits or modules to process Media Access Control (MAC) layer protocols and Physical (PHY) layer protocols. Network interface 104 may also generally include a Direct Memory Access (DMA) engine. The data transfer may be bi-directional (i.e., data transmitted to the network and/or received from the network). Host system 106 may be any type of computing system or communication device including, for example, a desktop, a workstation, a laptop, a tablet, a phone or smartphone or any type of wired or wireless platform. Host system 106 may include any number of processors 108, 110 or processor cores. A reduced latency device driver circuit 112, which may reside in host memory, may provide an interface between an operating system (OS), or other software, running on host system 106 and network interface 104.

Driver circuits 112 may interface with network interface 104 through the use of data descriptors, control register sets and/or any other suitable means of control, communication and/or event posting, as will be described in greater detail below. Network interface 104 may include any combination of hardware, firmware (including any type of programmable circuitry) and/or software configured to accomplish the transmission and reception of data between the host system 106 and the network 102.

Figure 2:
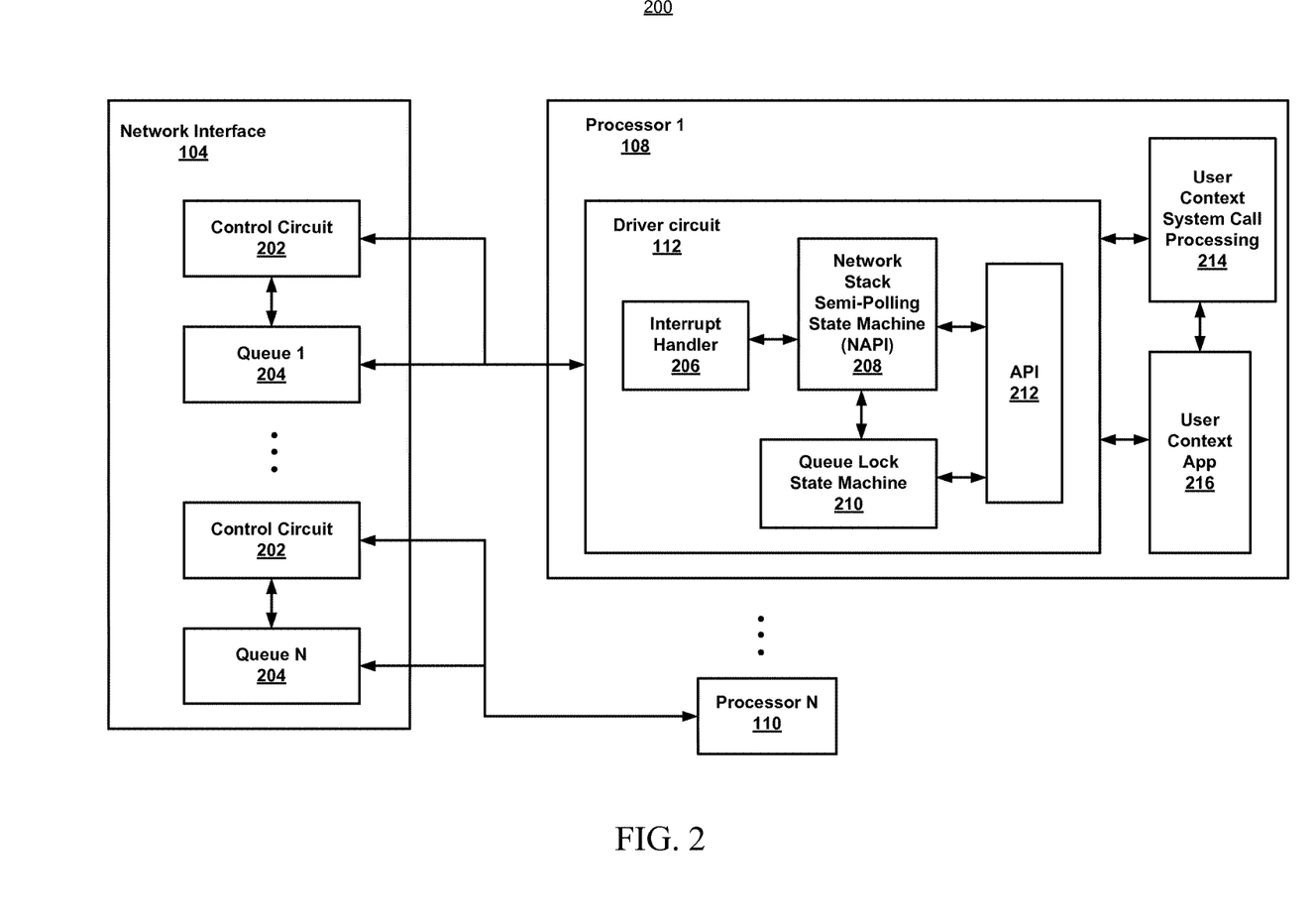
FIG. 2 illustrates a block diagram of one exemplary embodiment consistent with the present disclosure.

FIG. 2 illustrates a block diagram 200 of one exemplary embodiment consistent with the present disclosure. Network interface 104 is shown to include one or more sets of control circuits 202 and data queues 204. In some embodiments, the data queues may reside in memory on the host system 106. The data queues may be ring buffers or other suitable storage mechanisms configured to hold data which may include data packets or descriptors that include pointers to the data packets along with other information associated with the data packets. Each set of control circuits 202 and data queues 204 may be associated with one or more corresponding processor 108, 110 on host system 106. Each processor may host a device driver circuit 112, a user context system call processing module 214 (e.g., socket processing in a network stack) and user context application 216, the operations of which will be described in greater detail below. Device driver circuit 112 is further shown to include an interrupt handler 206, network stack semi-polling state machine 208, queue lock state machine 210 and an application programming interface (API) 212. The network stack semi-polling state machine 208 is sometimes referred to as a New API (NAPI) in connection with implementations on a Linux OS environment. In some embodiments, a portion of the network stack semi-polling state machine 208 may be implemented in the user context system call processing module 214. In the embodiment descriptions that follow, the term NAPI may be used as an acronym for the network stack semi-polling state machine 208 and should not to be confused with the API 212 which provides an interface between the driver circuit 112 and the user context processing 214, 216.

Figure 3:
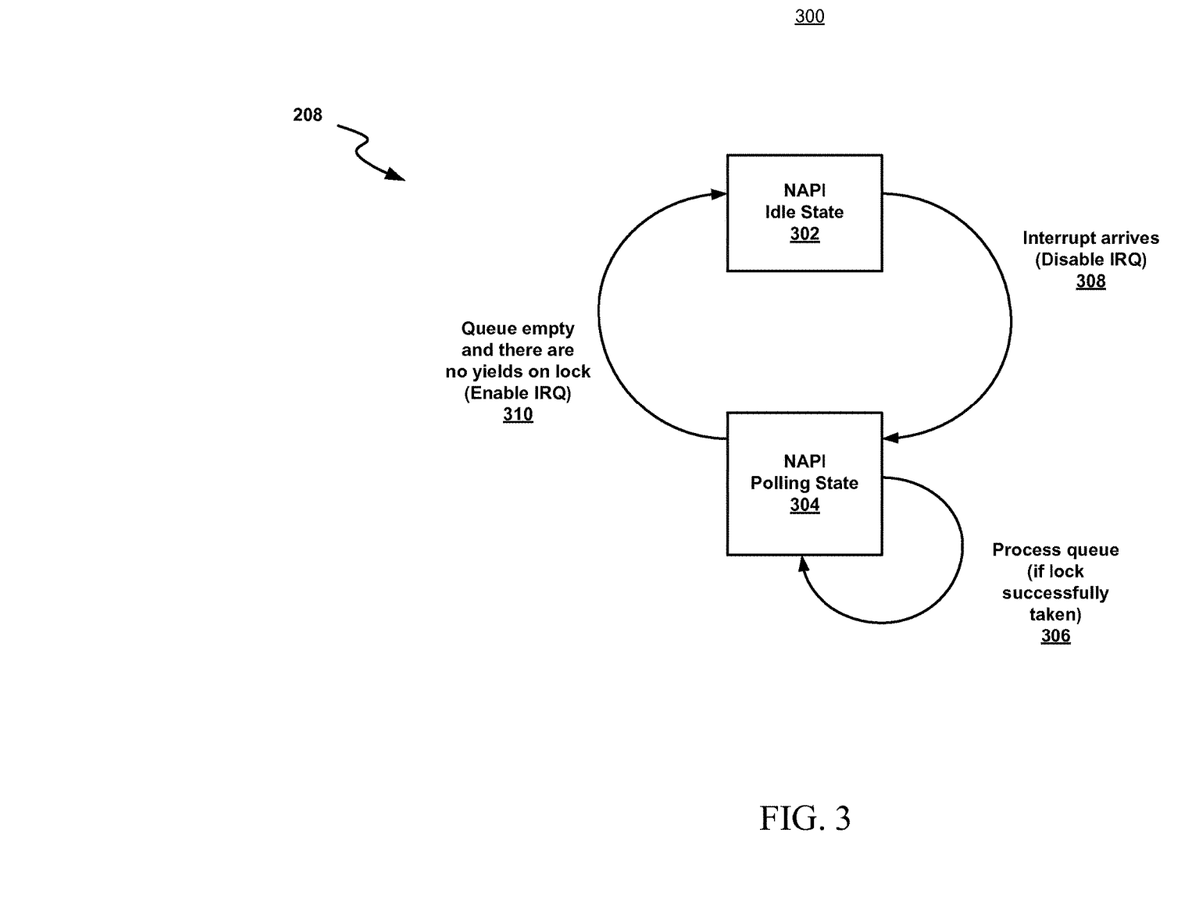
FIG. 3 illustrates a state diagram of an exemplary embodiment consistent with the present disclosure.

FIG. 3 illustrates a state diagram 300 of an exemplary embodiment consistent with the present disclosure. The state diagram 300 describes the states associated with the network stack semi-polling state machine 208 (NAPI) as well as the possible state transitions that comprise a finite state machine. The term "semi-polling" state machine is used to indicate that a combination of polling and interrupt notification is employed. A state transition 308 from NAPI idle state 302 to NAPI polling state 304 may occur in response to an interrupt being received from the network interface 104 through interrupt handler 206. Further interrupts may be disabled, either automatically (e.g., by the network interface, the processor or other interrupt related hardware) or through an interrupt disable command issued by the OS or driver circuit. In the NAPI polling state 304, the NAPI 208 polls the network interface data queue 204 to determine if more data is available for processing.

While in polling state 304, if a synchronization lock, associated with the queue, is successfully obtained, the NAPI 208 processes data from the data queues. This may involve processing the data up through the network stack to a destination user context application which may read the data, for example, through a socket. The synchronization lock may be any suitable type of synchronization mechanism including a spin lock, mutex, flag or semaphore. If the lock is unavailable to a process attempting to take the lock, that process will yield and the yield may be recorded.

If, while in polling state 304, it is determined that the data queue is empty and that no other processes have yielded on the lock, the NAPI 208 may re-enable interrupts and transition 310 back to idle state 302.

Figure 4:
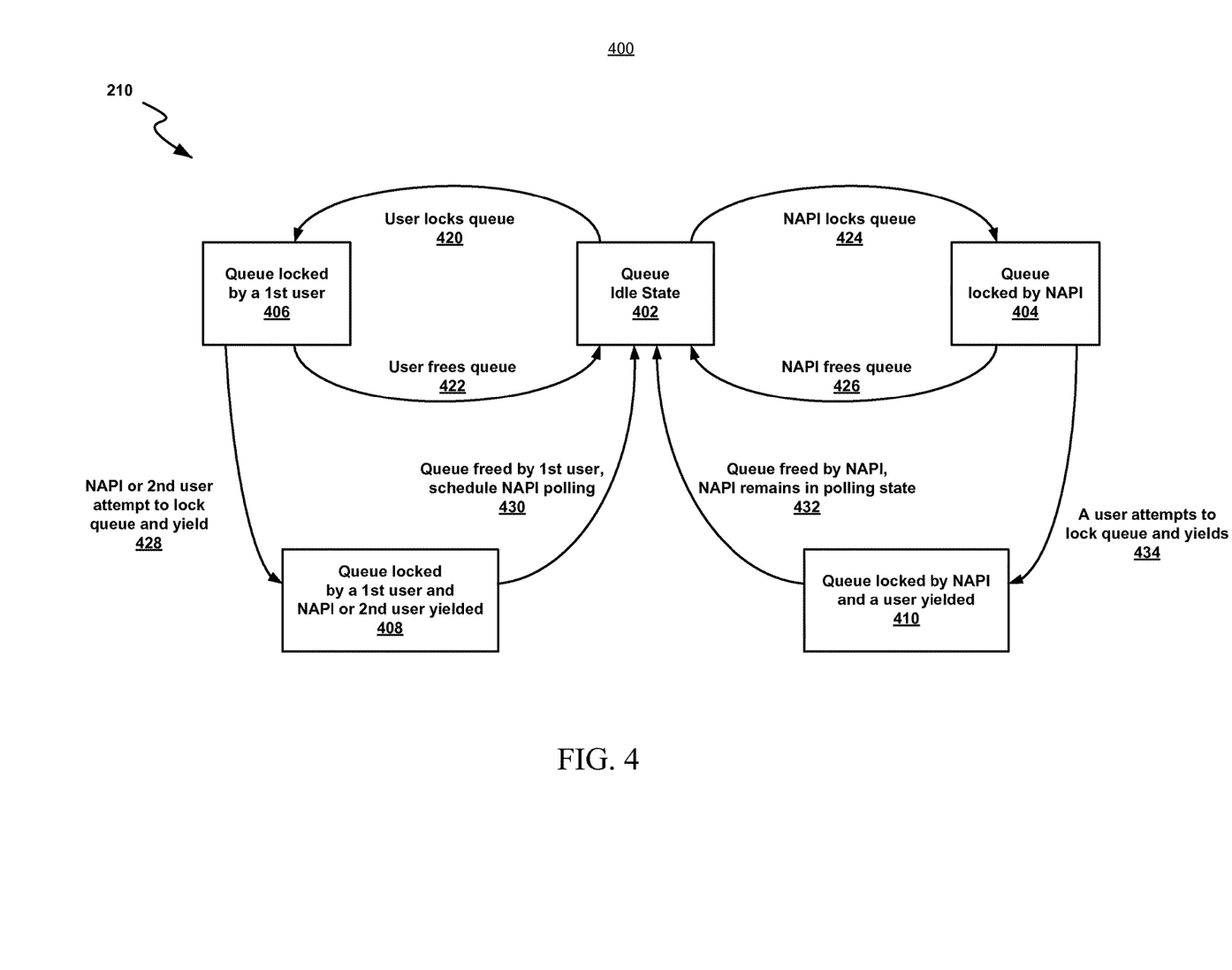
FIG. 4 illustrates a state diagram of another exemplary embodiment consistent with the present disclosure.

FIG. 4 illustrates a state diagram 400 of another exemplary embodiment consistent with the present disclosure. The state diagram 400 describes the states associated with the queue lock state machine 210 as well as the possible state transitions that comprise a finite state machine. The queue lock state machine may be in an idle state 402. A transition may occur from the idle state 402 to a locked state 404 if NAPI 208 successfully takes the lock. Similarly, a transition may occur from the idle state 402 to a locked-by-first-user-state 406 if a first user context 214,216 successfully takes the lock. After servicing the queue, NAPI 208 or the first user context 214,216 may subsequently free the queue 426, 422 by, for example, releasing the lock and transitioning the queue lock state machine back to the queue idle state 402.

The queue lock state machine may also transition from queue-locked-by-NAPI-state 404 to queue-locked-by-NAPI-and-user-yielded state 410. This may occur if a user context 214,216 attempts to lock the queue and yields 434 because the lock is not available (i.e., NAPI has the lock). While in this state 410, after completion of servicing the queue, NAPI may free the queue 432 by, for example, releasing the lock and transitioning the queue lock state machine back to the queue idle state 402. With this state transition 432, however, the NAPI state machine will remain in the NAPI polling state 304.

Similarly, the queue lock state machine may also transition from queue-locked-by-a-first-user-state 406 to queue-locked-by-a-first-user-and-NAPI-or-second-user-yielded state 408. This may occur if NAPI 208 or a second user context 214,216 attempts to lock the queue and yields 428 because the lock is not available (i.e., first user context has the lock). While in this state 408, after completion of servicing the queue, the first user context may free the queue 430 by, for example, releasing the lock and transitioning the queue lock state machine back to the queue idle state 402. With this state transition 430, however, the NAPI state machine will be scheduled or set into the NAPI polling state 304. In some embodiments, however, a NAPI yield may be ignored as a cause for state transition 428 since NAPI polling may continue independently of this event.

Figure 5:
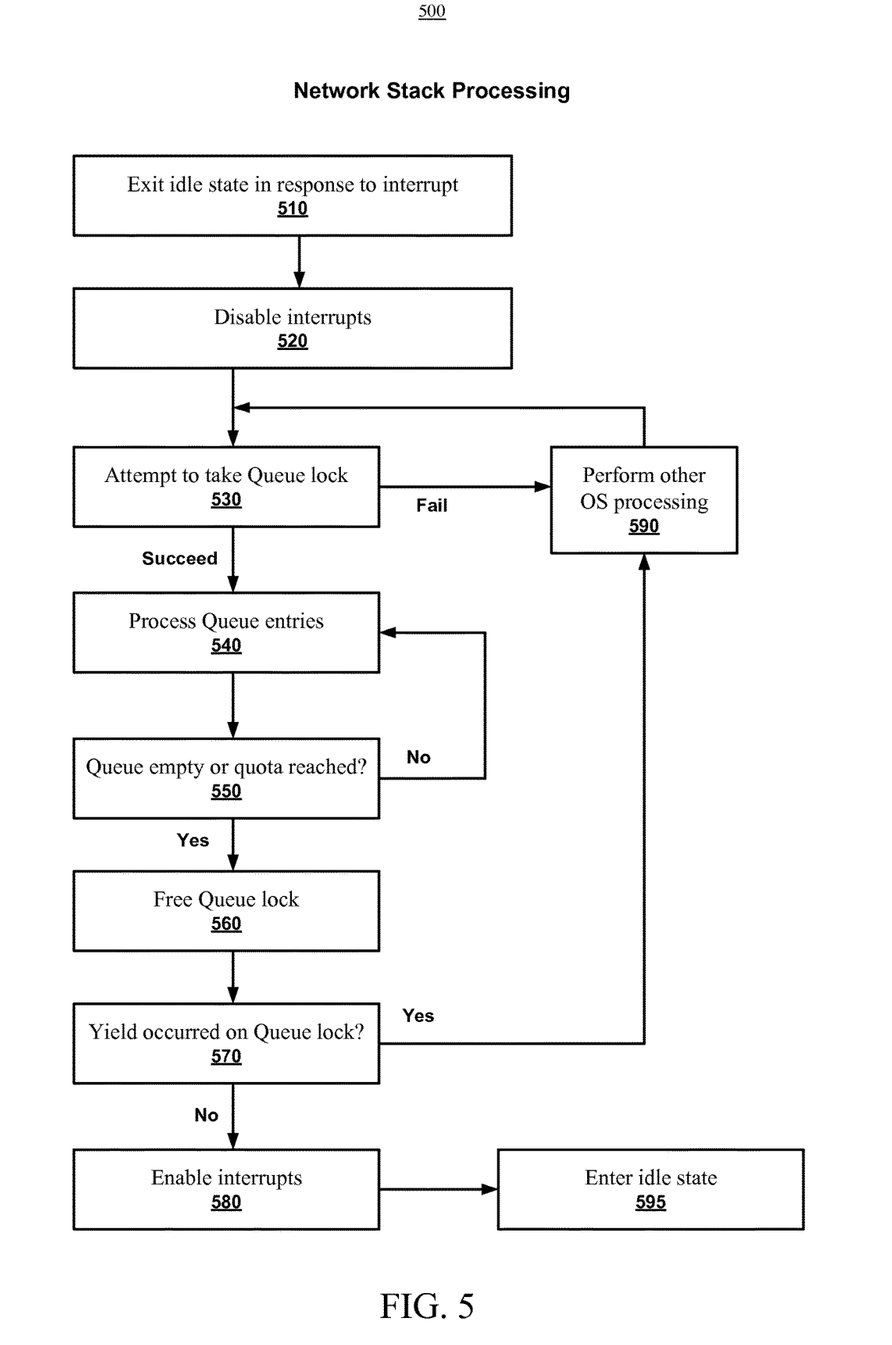
FIG. 5 illustrates a flowchart of operations of an exemplary embodiment consistent with the present disclosure.

FIG. 5 illustrates a flowchart of operations 500 of an exemplary embodiment consistent with the present disclosure. The operations provide a method for network stack processing by NAPI module 208. At operation 510, in response to receiving an interrupt from the network interface, the idle state is exited and further interrupts are disabled 520. At operation 530, an attempt is made to take the queue lock. If the attempt is not successful, for example user context system call processing has the lock, then NAPI yields on the queue lock and the OS may perform other processing 590 before re-attempting to take the queue lock.

If the attempt is successful, entries from the queue are serviced 540 (e.g., processed or sent up the network stack). When processing is completed (e.g., the queue is empty 550 or a pre-determined quota has been reached), the queue lock is freed or released 560. If no other processes have yielded on the queue lock 570, then interrupts are re-enabled 580 and a transition is made back to the idle state 595. Otherwise, if there were yields on the queue lock, NAPI remains in the polling state and the OS may perform other processing 590, or enter an idle state if no other tasks are pending, before re-attempting to take the queue lock.

Figure 6:
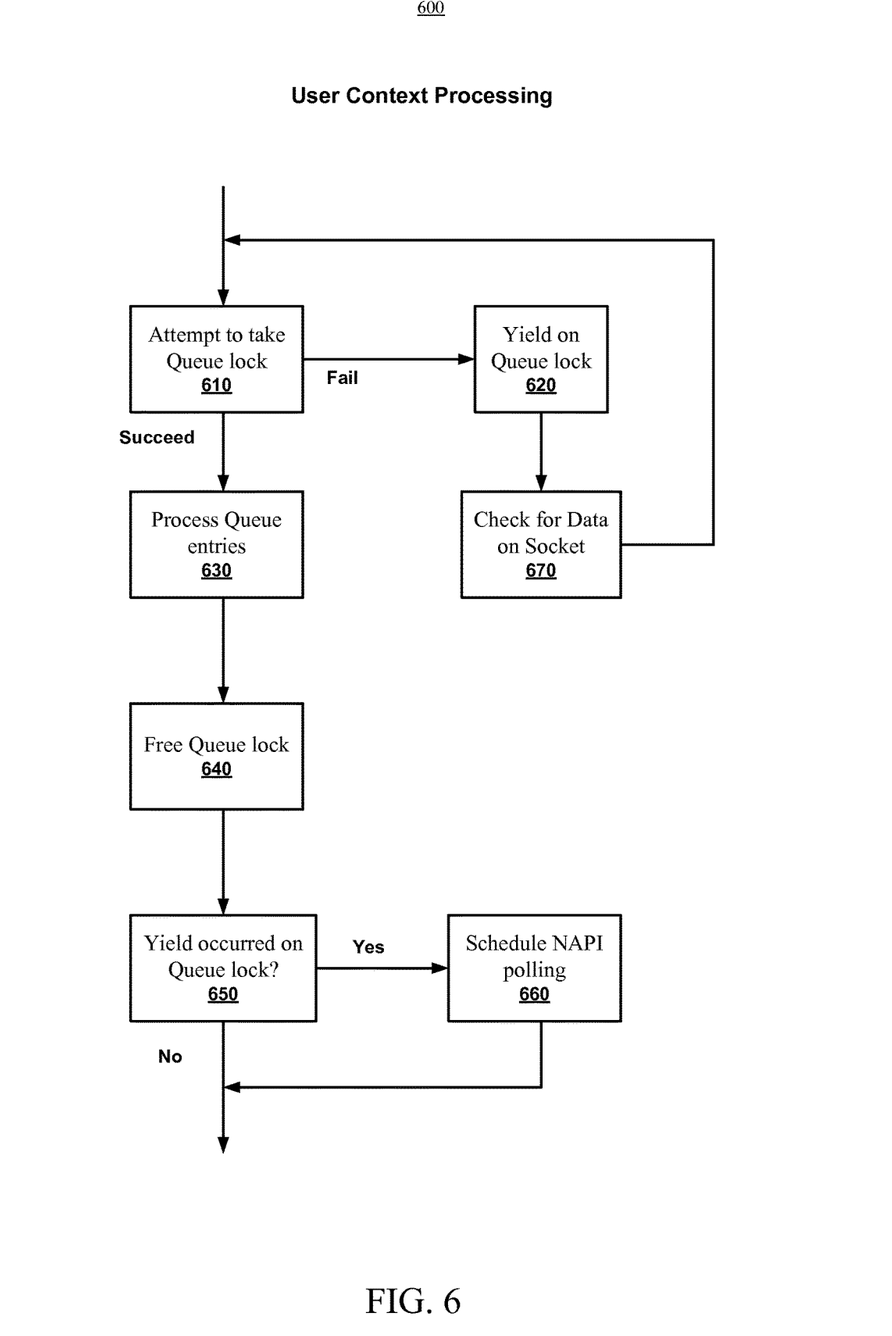
FIG. 6 illustrates a flowchart of operations of another exemplary embodiment consistent with the present disclosure.

FIG. 6 illustrates a flowchart of operations 600 of another exemplary embodiment consistent with the present disclosure. The operations provide a method for user context processing 214,216 with access to the network interface queues. At operation 610, an attempt is made to take the queue lock. If the attempt fails, the user context yields on the queue lock 620 and checks for availability of data, at operation 670, through the network stack, for example through socket processing 214. If the attempt is successful, entries from the queue are processed 630. The processing may include routing of the data through the network stack to the intended destination (e.g., a user context application to which the data is addressed). When processing is completed, the queue lock is freed 640. At operation 650, a check is made to determine if other process have yielded on the lock and if so, the NAPI state machine is scheduled or set into the NAPI polling state 304.

In some embodiments, when an entity (e.g., the driver circuit or a user context processing module) yields on the queue lock, the entity may execute "monitor" and "mwait" instructions (op-codes) on the processor. The monitor and mwait instructions may be configured to place the processor into an idle or sleep mode that is triggered to wake when additional data arrives at the data queue. In some embodiments, the wake trigger may be linked to the arrival of data at a socket associated with user context processing. In some embodiments, the wake trigger may be linked to the release of the queue lock. Use of the monitor and mwait instructions may be useful in a multiple processor environment where a second processor services the queue while the first processor sleeps. In some embodiments the mwait instruction may be a timed mwait instruction. The timed mwait instruction may be configured with a time limiting mechanism, such as, for example, to trigger a wake after a time threshold has expired.

In an alternative embodiment, any suitable locking mechanism may be employed and the NAPI state machine may perform as described previously except that the checks, to determine whether another entity has yielded on the lock, may be omitted. Additionally, in this alternative embodiment, the other entities may employ the monitor and mwait instructions as described above.

Figure 7:
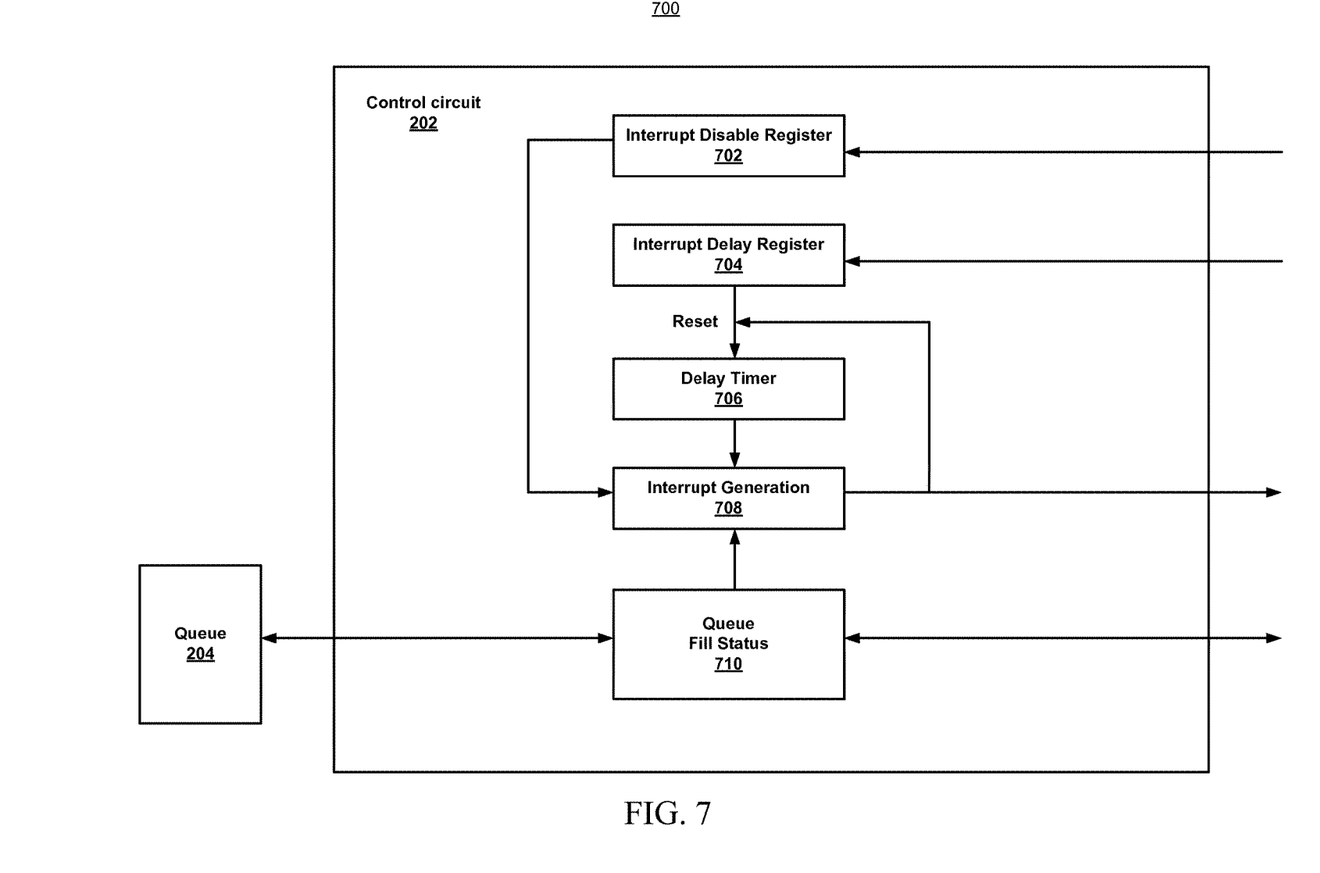
FIG. 7 illustrates a block diagram of another exemplary embodiment consistent with the present disclosure.

FIG. 7 illustrates a block diagram 700 of another exemplary embodiment consistent with the present disclosure. An embodiment of the network interface control circuit 202 is shown in greater detail. Shown are interrupt disable register 702, interrupt delay register 704, delay timer 706, interrupt generation circuit 708 and queue fill status circuit 710. Although registers and other components are shown as separate entities for discussion purposes, they may be combined in any suitable manner.

Queue fill status circuit 710 may be configured to indicate status of the data queue 204 with respect to data availability. Head and tail pointer registers (not shown) may be used to indicate the location of free sections and in-use sections of the data queue 204, for example if the data queue 204 is configured as a ring or circular buffer. In some embodiments, the tail pointer may be associated with ready (empty) receive buffers and the head pointer may be associated with full buffers waiting to be processed. In some embodiments, other, equivalent, conventions may be used. The queue fill status circuit may compare the head and tail pointers to determine if the queue is empty or not-empty, for example whether or not data is available to be processed. Any other suitable mechanism may also be employed to determine the fill status of the queue. Queue fill status circuit 710 may provide an indication of the queue fill status to host entities that poll the network interface (e.g., the NAPI component 208 of the driver circuit 112 and/or the user context 214, 216).

Interrupt generation circuit 708 may be configured to generate an interrupt in response to a combination of conditions. These conditions may include an indication from the queue fill status circuit 710 of the presence of data in the queue and an expiration of the interrupt delay timer 706. Interrupt delay register 704 may be configured to enable host entities, for example user context modules/applications, to reset the interrupt delay timer and therefore delay the generation of the next interrupt as will be described in greater detail below. Interrupt disable register 702 is also provided to enable host entities to disable generation of further interrupts.

Figure 8:
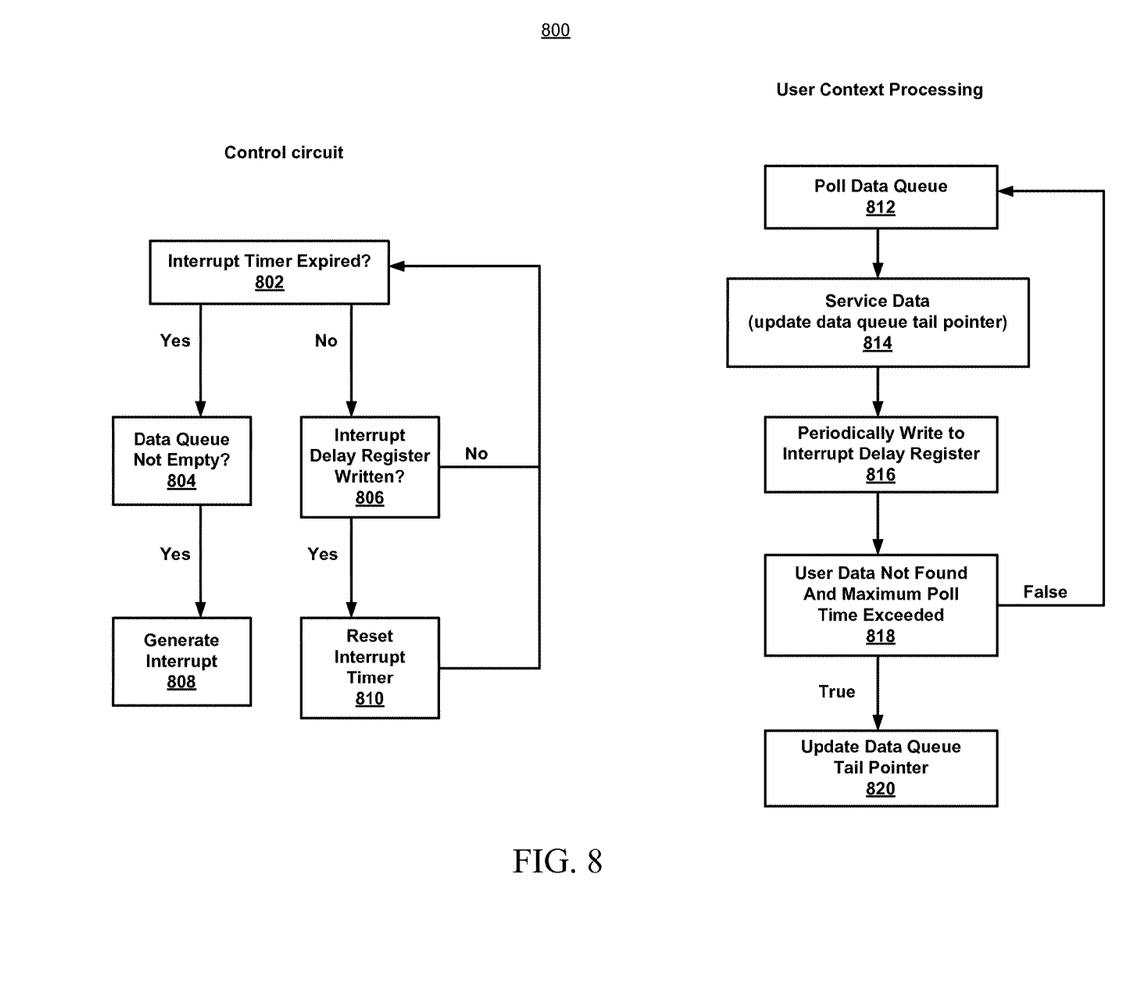
FIG. 8 illustrates a flowchart of operations of another exemplary embodiment consistent with the present disclosure.

FIG. 8 illustrates a flowchart of operations 800 of another exemplary embodiment consistent with the present disclosure. Operations of the control circuit 202, in connection with the embodiment described in FIG. 7, are detailed on the left hand side 802-810. Operations of user context processing 214,216, in connection with the embodiment described in FIG. 7, are detailed on the right hand side 812-820.

At operation 802, the interrupt delay timer is checked for expiration. If the timer has expired and the data queue is not empty 804, then an interrupt may be generated 808. If the timer has not expired and the interrupt delay register has been written 806, then the interrupt delay timer may be reset to postpone or delay the generation of the next potential interrupt.

At operation 812, the user context may poll the data queue. Data retrieved from the queue may be processed at operation 814. Optionally, the data queue tail pointer may be updated (or other suitable means employed) to notify the network interface of the elements in the queue that are now free. The interrupt delay register may be written to on a periodic basis 816 to delay subsequent interrupts while the user context is servicing the queue. At operation 818, if additional data is not found on the queue and a maximum polling time threshold has been exceeded, further polling may be halted or suspended and the data queue tail pointer may again be updated 820.

Figure 9:
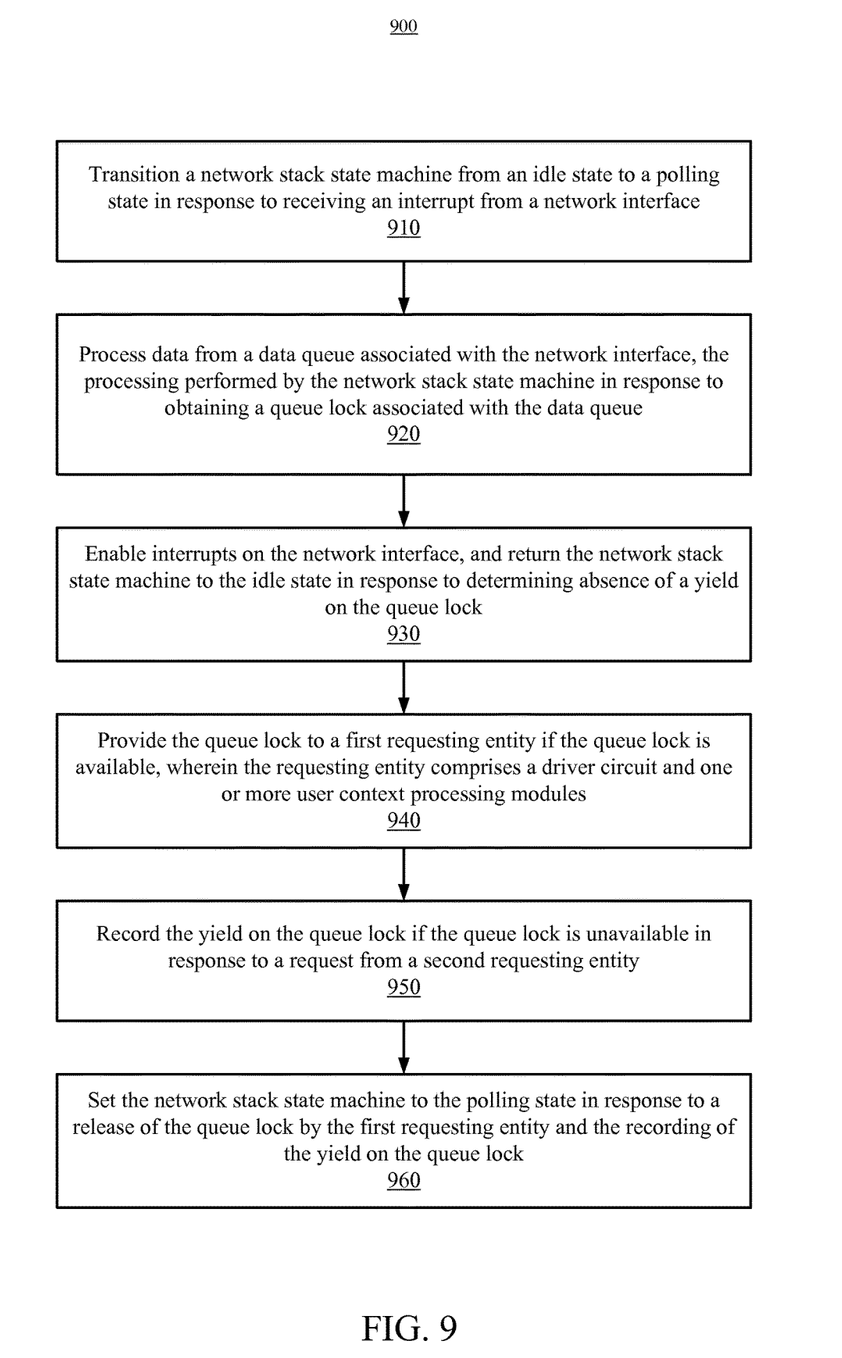
FIG. 9 illustrates a flowchart of operations of another exemplary embodiment consistent with the present disclosure.

FIG. 9 illustrates a flowchart of operations 900 of another exemplary embodiment consistent with the present disclosure. The operations provide a method for packet processing with reduced latency. At operation 910, a network stack state machine transitions from an idle state to a polling state in response to receiving an interrupt from a network interface. At operation 920, data from a data queue associated with the network interface is processed by the network stack state machine in response to obtaining a queue lock associated with the data queue. At operation 930, interrupts on the network interface are enabled, and the network stack state machine is returned to the idle state in response to determining an absence of a yield on the queue lock. At operation 940, the queue lock is provided to a first requesting entity if the queue lock is available. Requesting entities may include a driver circuit and one or more user context processing modules. At operation 950, if the queue lock is unavailable in response to a request from a second requesting entity, a record is made of the yield on the queue lock. At operation 960, the network stack state machine is set to the polling state in response to a release of the queue lock by the first requesting entity and the recording of the yield on the queue lock.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. In some embodiments, circuitry may be implemented as software or any suitable set of programmable operations. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides devices, methods and computer readable media for packet processing with reduced latency. The following examples pertain to further embodiments.

The device may include a driver circuit configured to reduce processing latency. The driver circuit may include a network stack circuit configured to transition from an idle state to a polling state in response to receiving an interrupt from a network interface; process data from a data queue associated with the network interface, the processing in response to obtaining a queue lock associated with the data queue; and enable interrupts on the network interface, and return to the idle state in response to determining the absence of a yield on the queue lock. The driver circuit may also include a queue lock circuit, which may be a state machine, configured to provide the queue lock to a first requesting entity if the queue lock is available, and the requesting entity includes the driver circuit and one or more user context processing modules; record the yield on the queue lock if the queue lock is unavailable in response to a request from a second requesting entity; and set the network stack circuit to the polling state in response to a release of the queue lock by the first requesting entity and the recording of the yield on the queue lock.

Another example device includes the forgoing components and the network stack circuit is a network stack state machine and the queue lock circuit is a queue lock state machine.

Another example device includes the forgoing components and the yield includes executing a monitor instruction and an mwait instruction on a processor associated with the driver circuit, the monitor and mwait instructions configured to transition the processor to a sleep state, the sleep state terminating in response to availability of data in the data queue.

Another example device includes the forgoing components and the processing of data by the network stack circuit further includes providing the data to one of the user context processing modules.

Another example device includes the forgoing components and further includes an API configured to provide access, by the user context processing modules, to the data queue associated with the network interface.

Another example device includes the forgoing components and the API is further configured to provide access, to an interrupt control register associated with the network interface, the interrupt control register configured to enable postponement of a pending interrupt.

Another example device includes the forgoing components and the network stack circuit is further configured to disable interrupts from the network interface when transitioning from the idle state to the polling state.

Another example device includes the forgoing components and the data queue includes a transmit queue and a receive queue.

According to another aspect there is provided a network interface configured for reduced latency processing. The network interface may include a data queue configured to store data descriptors associated with data packets, the data packets transferred between a network and a driver circuit. The network interface of this example may also include an interrupt generation circuit configured to generate an interrupt to the driver circuit, and the interrupt is generated based at least in part on at least one of an expiration of a delay timer and a non-empty condition of the data queue. The network interface of this example may further include an interrupt delay register configured to enable the driver circuit to reset the delay timer, the reset postponing the interrupt generation.

Another example network interface includes the forgoing components and the interrupt is generated in response to a combination of the expiration of the delay timer and the non-empty condition of the data queue.

Another example network interface includes the forgoing components and further includes a queue fill status circuit configured to indicate the non-empty condition based on a comparison of pointer registers associated with free sections of the data queue and in-use sections of the data queue.

According to another aspect there is provided a method. The method may include transitioning a network stack circuit from an idle state to a polling state in response to receiving an interrupt from a network interface. The method of this example may also include processing data from a data queue associated with the network interface, the processing performed by the network stack circuit in response to obtaining a queue lock associated with the data queue. The method of this example may further include enabling interrupts on the network interface, and returning the network stack circuit to the idle state in response to determining absence of a yield on the queue lock. The method of this example may further include providing the queue lock to a first requesting entity if the queue lock is available, and the requesting entity includes a driver circuit and one or more user context processing modules. The method of this example may further include recording the yield on the queue lock if the queue lock is unavailable in response to a request from a second requesting entity. The method of this example may further include setting the network stack circuit to the polling state in response to a release of the queue lock by the first requesting entity and the recording of the yield on the queue lock.

Another example method includes the forgoing operations and the network stack circuit is a network stack state machine.

Another example method includes the forgoing operations and the yield includes executing a monitor instruction and an mwait instruction on a processor associated with the driver circuit, the monitor and mwait instructions configured to transition the processor to a sleep state, the sleep state terminating in response to availability of data in the data queue.

Another example method includes the forgoing operations and the processing of data by the network stack circuit further includes providing the data to one of the user context processing modules.

Another example method includes the forgoing operations and further includes providing access, by the user context processing modules, to the data queue associated with the network interface.

Another example method includes the forgoing operations and further includes providing access, by the user context processing modules, to an interrupt control register associated with the network interface, the interrupt control register configured to enable postponement of a pending interrupt.

Another example method includes the forgoing operations and further includes disabling interrupts from the network interface when transitioning the network stack circuit from the idle state to the polling state.

According to another aspect there is provided a system. The system may include a means for transitioning a network stack circuit from an idle state to a polling state in response to receiving an interrupt from a network interface. The system of this example may also include a means for processing data from a data queue associated with the network interface, the processing performed by the network stack circuit in response to obtaining a queue lock associated with the data queue. The system of this example may further include a means for enabling interrupts on the network interface, and returning the network stack circuit to the idle state in response to determining absence of a yield on the queue lock. The system of this example may further include a means for providing the queue lock to a first requesting entity if the queue lock is available, and the requesting entity includes a driver circuit and one or more user context processing modules. The system of this example may further include a means for recording the yield on the queue lock if the queue lock is unavailable in response to a request from a second requesting entity. The system of this example may further include a means for setting the network stack circuit to the polling state in response to a release of the queue lock by the first requesting entity and the recording of the yield on the queue lock.

Another example system includes the forgoing components and the network stack circuit is a network stack state machine.

Another example system includes the forgoing components and the yield includes a means for executing a monitor instruction and an mwait instruction on a processor associated with the driver circuit, the monitor and mwait instructions configured to transition the processor to a sleep state, the sleep state terminating in response to availability of data in the data queue.

Another example system includes the forgoing components and the processing of data by the network stack circuit further includes a means for providing the data to one of the user context processing modules.

Another example system includes the forgoing components and further includes a means for providing access, by the user context processing modules, to the data queue associated with the network interface.

Another example system includes the forgoing components and further includes a means for providing access, by the user context processing modules, to an interrupt control register associated with the network interface, the interrupt control register configured to enable postponement of a pending interrupt.

Another example system includes the forgoing components and further includes a means for disabling interrupts from the network interface when transitioning the network stack circuit from the idle state to the polling state.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for reduced latency processing, the system comprising:
   a driver circuit and a network interface, the driver circuit comprising:
   a network stack circuit configured to:
   process data from a data queue associated with said network interface, said processing in response to obtaining a queue lock associated with said data queue; and
   enable interrupts on said network interface and return to an idle state in response to determining an absence of a yield on said queue lock;
   a queue lock circuit configured to:
   provide said queue lock to a first requesting entity when said queue lock is available, wherein said first requesting entity comprises said driver circuit and one or more user context processing modules;

record said yield on said queue lock when said queue lock is unavailable in response to a request from a second requesting entity;

set said network stack circuit to a polling state in response to a release of said queue lock by said first requesting entity and the recording of said yield on said queue lock;

the network interface comprising:

a data queue configured to store data descriptors associated with data packets, said data packets transferred between a network and the driver circuit;

an interrupt generation circuit configured to generate an interrupt to said driver circuit, wherein said interrupt is generated based at least in part on at least one of an expiration of a delay timer and a non-empty condition of said data queue; and an interrupt delay register configured to enable said driver circuit to reset said delay timer, said reset postponing said interrupt generation.

2. The system of claim 1, wherein said network stack circuit is a network stack state machine and said queue lock circuit is a queue lock state machine.

3. The system of claim 1, wherein said yield comprises executing a monitor instruction and an mwait instruction on a processor associated with said driver circuit, said monitor and mwait instructions configured to transition said processor to a sleep state, said sleep state terminating in response to availability of data in said data queue.

4. The system of claim 1, wherein said processing of data by said network stack circuit further comprises providing said data to one of said user context processing modules.

5. The system of claim 1, further comprising an application programming interface (API) configured to provide access, by said user context processing modules, to said data queue associated with said network interface.

6. The system of claim 5, wherein said API is further configured to provide access, to an interrupt control register associated with said network interface, said interrupt control register configured to enable postponement of a pending interrupt.

7. The system of claim 1, wherein said network stack circuit is further configured to disable interrupts from said network interface when transitioning from said idle state to said polling state.

8. The system of claim 1, wherein said data queue comprises a transmit queue and a receive queue.

9. The system of claim 1, wherein said interrupt is generated in response to a combination of said expiration of said delay timer and said non-empty condition of said data queue.

10. The system of claim 1, further comprising a queue fill status circuit configured to indicate said non-empty condition based on a comparison of pointer registers associated with free sections of said data queue and in-use sections of said data queue.

11. The system of claim 1, the network stack circuit configured to transition from an idle state to a polling state in response to receiving an interrupt from a network interface.

* * * * *